(No Model.)
W. E. PATCHIN.
DAMPER.
No. 520,495. Patented May 29, 1894.
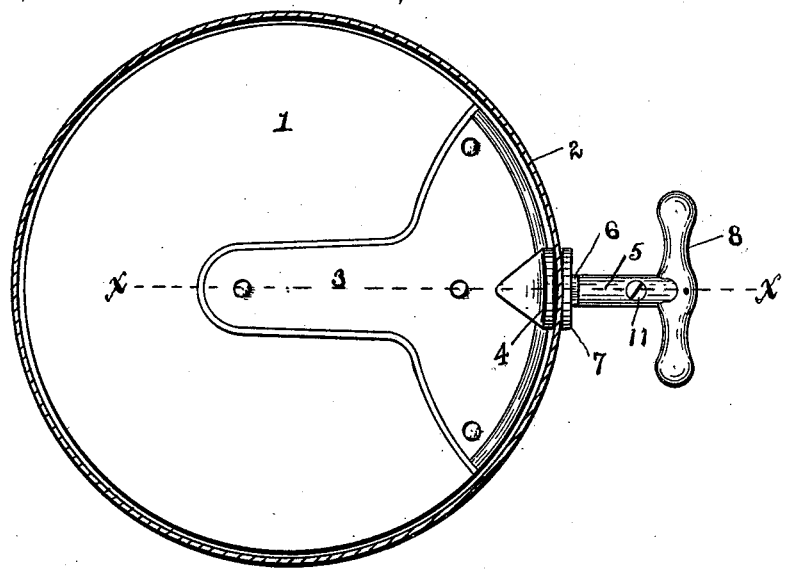
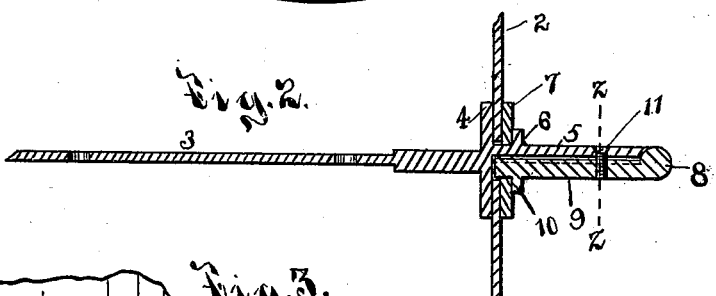
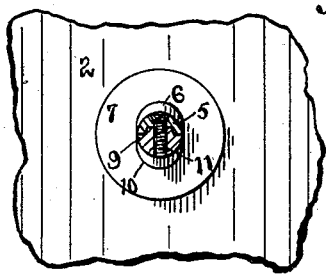
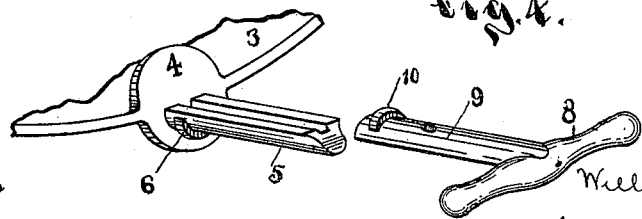
Witnesses
H. E. Bates.
Thomas Durant
Inventor
William E. Patchin
by Church & Church
his Attorney

UNITED STATES PATENT OFFICE.

WILLIAM E. PATCHIN, OF ROCHESTER, NEW YORK.

DAMPER.

SPECIFICATION forming part of Letters Patent No. 520,495, dated May 29, 1894.

Application filed December 20, 1893. Serial No. 494,214. (No model.)

*To all whom it may concern:*

Be it known that I, WILLIAM E. PATCHIN, of Rochester, in the county of Monroe and State of New York, have invented certain new and useful Improvements in Dampers; and I do hereby declare the following to be a full, clear, and exact description of the same, reference being had to the the accompanying drawings, forming a part of this specification, and to the reference-numerals marked thereon.

My present invention has for its object to provide an improved pipe-damper, capable of use in either hot air or smoke pipes, and it consists in certain improved constructions and combinations of parts, all as will be hereinafter fully described and the novel features pointed out in the claims at the end of this specification.

In the drawings: Figure 1 is a sectional view through a pipe showing the damper in plan; Fig. 2, a sectional view on the line x—x of Fig. 1; Fig. 3, a sectional view on the line z—z of Fig. 2, and Fig. 4, a perspective view of the parts detached.

Similar reference numerals in the several figures indicate similar parts.

The damper disk 1, shown in Fig. 1, may be of any suitable material adapted to fit the pipe 2 and to be turned therein as usual, and to this is secured the plate 3 forming part of my invention having the collar or abutment 4 thereon and also the semicircular stem or extension 5 provided with the lug or projection 6 on its rounded side, said lug adapted to project in front of the loose washer 7 arranged against the outside of the pipe and confine it in position. The handle 8 is provided with a semicircular stem or extension 9 having a lug 10 corresponding to the stem 5 on the other part, and its lug 6. The two parts of the stem are preferably provided with the longitudinally-extending co-operat- tongues and grooves to prevent relative lateral movement, and are connected by the screw 11, or other suitable fastening device, said screw serving not only to hold the parts of the stem together, but as well to hold the damper in place within the pipe 2.

In applying the damper to the pipe it is only necessary to provide an aperture in the pipe 2 in the position desired, then to insert the stem 5 through said aperture from the inside, and this stem is of such shape, it will be noted, that even if the aperture is not perfectly round a rotary movement of the damper will bend the sides so as to make a round hole of the correct size. The washer 7 is now placed over the stem and between the lug 6 thereon and the outside of the pipe 2,—then the stem section 9 is placed in position with its lug 10 against the washer and its inner end within the aperture in the pipe and the two parts connected by means of the screw 11.

This damper is very simple and cheap in construction, and while I prefer to form the disk 1 separate from the plate 3, it is obvious that it may be cast integral if desired, and made in standard sizes, and therefore when the damper is referred to in the claims it is intended to mean either an integral or an attached damper-disk, as shown.

I claim as my invention—

1. The combination with the damper having the abutment adapted to engage the inside of a pipe, the stem section and the lug thereon, said parts being formed integral, and a slight space being left between the abutment and lug, of the cooperating stem section formed with the lug corresponding to the one on the other section and the handle, and the screw for holding the stem sections together and the damper in place, substantially as described.

2. The combination with the damper having the abutment adapted to engage the inside of a pipe, the stem section and the lug thereon, said parts being formed integral and a slight space being left between the abutment and lug, of the cooperating stem section formed with the lug corresponding to the one on the other section, and the handle thereon, the screw for holding the stem sections together, and the washer on the stem held in position by the lugs on the stem sections, substantially as described.

WM. E. PATCHIN.

Witnesses:
FREDERICK F. CHURCH,
G. A. RODA.